(12) United States Patent
Muraoka et al.

(10) Patent No.: US 7,927,729 B2
(45) Date of Patent: Apr. 19, 2011

(54) SECONDARY BATTERY

(75) Inventors: Hiroki Muraoka, Osaka (JP); Takeshi Fukumasa, Osaka (JP); Hiroaki Furuta, Osaka (JP); Hiroshi Matsuno, Osaka (JP)

(73) Assignee: Panasonic Corporation, Osaka (JP)

( * ) Notice: Subject to any disclaimer, the term of this patent is extended or adjusted under 35 U.S.C. 154(b) by 914 days.

(21) Appl. No.: 10/594,276

(22) PCT Filed: Mar. 23, 2005

(86) PCT No.: PCT/JP2005/005240
§ 371 (c)(1),
(2), (4) Date: Sep. 26, 2006

(87) PCT Pub. No.: WO2005/093892
PCT Pub. Date: Oct. 6, 2005

(65) Prior Publication Data
US 2007/0207387 A1    Sep. 6, 2007

(30) Foreign Application Priority Data
Mar. 26, 2004 (JP) ................................. 2004-091477

(51) Int. Cl.
*H01M 6/10* (2006.01)
*H01M 4/00* (2006.01)
*H01M 2/16* (2006.01)
*H01M 2/18* (2006.01)

(52) U.S. Cl. .......... 429/94; 429/122; 429/129; 429/131; 429/133; 429/134; 429/135; 429/142; 429/144

(58) Field of Classification Search ..................... 429/94, 429/233; *H01M 6/10, 10/40*
See application file for complete search history.

(56) References Cited

U.S. PATENT DOCUMENTS
5,508,122 A   4/1996   Narukawa et al.
6,805,994 B1  10/2004  Shibamoto
(Continued)

FOREIGN PATENT DOCUMENTS
JP   4-109551 A   4/1992
(Continued)

OTHER PUBLICATIONS

Chinese Office Action, with English Translation, issued in Chinese Patent Application No. CN 2005800095373, dated Mar. 14, 2008.

(Continued)

*Primary Examiner* — Melvin C Mayes
*Assistant Examiner* — Jun Li
(74) *Attorney, Agent, or Firm* — McDermott Will & Emery LLP

(57) ABSTRACT

A secondary battery having an electrode assembly in which strip-shaped positive and negative electrode plates are spirally wound with a strip-shaped separator interposed therebetween, the positive and negative electrode plates comprising a current collector and a material mixture layer carried thereon. The positive electrode plate has, in a vicinity of a first end at an initial winding side, an exposed portion of the positive electrode current collector having no positive electrode material mixture formed thereon and a positive electrode lead connected to the exposed portion. A first winding turn outwardly adjacent to a connecting portion of the positive electrode lead with the separator interposed therebetween and a second winding turn outwardly adjacent to the first winding turn with the separator interposed therebetween comprise a portion of the negative electrode plate carrying the negative electrode material mixture layer.

2 Claims, 3 Drawing Sheets

U.S. PATENT DOCUMENTS

2004/0096733 A1 * 5/2004 Shibamoto et al. ............. 429/94
2004/0202941 A1 10/2004 Ugawa
2004/0265700 A1 12/2004 Ugawa et al.

FOREIGN PATENT DOCUMENTS

| JP | 7-320770 A | 12/1995 |
|---|---|---|
| JP | 2001-167798 | 6/2001 |
| JP | 2001-266927 A | 9/2001 |
| JP | 2003-303624 A | 10/2003 |
| JP | 2004-273153 A | 9/2004 |
| JP | 2004-311272 A | 11/2004 |

OTHER PUBLICATIONS

Korean Office Action issued in Korean Patent Application No. KR 10-2006-7022048, mailed Aug. 23, 2007.

* cited by examiner

SECONDARY BATTERY

RELATED APPLICATIONS

This application is the U.S. National Phase under 35 U.S.C. §371 of International Application No. PCT/JP2005/005240, filed on Mar. 23, 2005, which in turn claims the benefit of Japanese Application No. 2004-091477, filed on Mar. 26, 2004, the disclosures of which Applications are incorporated by reference herein.

TECHNICAL FIELD

The present invention relates to a secondary battery with improved reliability by preventing a positive electrode plate from breaking or damage during production of an electrode assembly in which the positive electrode plate and a negative electrode plate are spirally wound with a separator interposed therebetween.

BACKGROUND ART

Secondary batteries typically comprise an electrode assembly in which a positive electrode plate and a negative electrode plate are spirally wound with a strip-shaped separator interposed therebetween. The positive electrode plate includes a strip-shaped current collector and a positive electrode material mixture layer formed on the current collector. The negative electrode plate includes a strip-shaped current collector and a negative electrode material mixture layer formed on the current collector. The innermost winding turn of the spirally-wound electrode assembly has an exposed portion of the positive electrode current collector on which no positive electrode material-mixture layer is formed. In the structure called a positive electrode lead forward structure, a positive electrode lead is connected to the exposed portion of the positive electrode current collector, in other words, the positive electrode lead is connected to the winding start portion of the electrode assembly.

In order to prevent an internal short-circuit from occurring in the electrode assembly having such positive electrode lead forward structure, an arrangement is proposed in which the distance between the positive electrode lead and the negative electrode plate is increased (see, for example, Patent Document 1 and Patent Document 2).

Patent Document 1: Japanese Patent No. 3237015
Patent Document 2: Japanese Patent No. 3373934

DISCLOSURE OF THE INVENTION

Problem that the Invention is to Solve

In the electrode assembly having positive electrode lead forward structure as described above, a positive electrode lead having a desired thickness is arranged on the innermost winding turn of the electrode assembly, that is, the winding turn having the smallest radius of curvature. As such, when the positive electrode plate having a positive electrode lead connected thereto is spirally wound with a negative electrode plate with a separator interposed therebetween, the portions of the positive and negative electrode plates and the separator which are located above the ends of the positive electrode lead arranged parallel to the width direction of the positive electrode current collector have a larger curvature than other portions thereof.

Moreover, conventionally, an increased amount of positive electrode material mixture is applied to the positive electrode current collector, which is rolled by a press roll to form a material mixture layer having a desired thickness, so as to increase the density of the positive electrode active material and improve the capacity of the battery. When a positive electrode active material comprising a lithium-containing composite oxide and a negative electrode active material comprising a carbon material are used together, because the positive electrode active material is more rigid than the negative electrode active material, the positive electrode active material may be embedded into the current collector during the rolling process, locally reducing the thickness of the current collector.

If the portion of the current collector having a reduced thickness is overlaid on the portion having a large curvature as described above, the portion having a reduced thickness may be broken. Even if the positive electrode is not broken completely but partially, burrs occur in the broken portion thereof, and the positive electrode plate comes in contact with the other electrode plate through the burrs, causing an internal short-circuit.

In view of the above, an object of the present invention is to provide a secondary battery having improved reliability by preventing the electrode plate from breaking and an internal short-circuit due to contact between the electrode plates from occurring.

Means for Solving the Problem

The present invention relates to a secondary battery comprising an electrode assembly in which a strip-shaped positive electrode plate and a strip-shaped negative electrode plate are spirally wound with a strip-shaped separator interposed therebetween, the positive electrode plate comprising a positive electrode current collector and a positive electrode material mixture layer carried on the positive electrode current collector, and the negative electrode plate comprising a negative electrode current collector and a negative electrode material mixture layer carried on the negative electrode current collector. The positive electrode plate has, in a vicinity of a first end at an initial winding side, an exposed portion of the positive electrode current collector having the positive electrode material mixture layer not formed thereon, and a positive electrode lead connected to the exposed portion. A first winding turn outwardly adjacent to a connecting portion of the positive electrode lead with the separator interposed therebetween, and a second winding turn outwardly adjacent to the first winding turn with the separator interposed therebetween comprise a portion of the negative electrode plate carrying the negative electrode material mixture layer.

In the lithium ion secondary battery, a third winding turn outwardly adjacent to the second winding turn with the separator interposed therebetween preferably comprises a portion of the positive electrode plate carrying the positive electrode material mixture layer.

EFFECT OF THE INVENTION

In a secondary battery of the present invention, a first winding turn outwardly adjacent to a connecting portion of the positive electrode lead with the separator interposed therebetween, and a second winding turn outwardly adjacent to the first winding turn with the separator interposed therebetween, comprise a portion of the negative electrode plate carrying the negative electrode material mixture layer. Because the first and second winding turns function as a cushion, the curvature of a portion of the winding turn comprising the positive and negative electrode plates and the separator which is located above the ends of the positive electrode lead arranged parallel to the width direction of the positive electrode current collector can be reduced. This prevents the portion of the positive electrode plate carrying the positive electrode material mixture layer from breaking and an internal short-circuit from occurring. As a result, it is possible to provide a highly reliable secondary battery.

BRIEF DESCRIPTION OF THE INVENTION

BEST MODE FOR CARRYING OUT THE INVENTION

Figure 1:
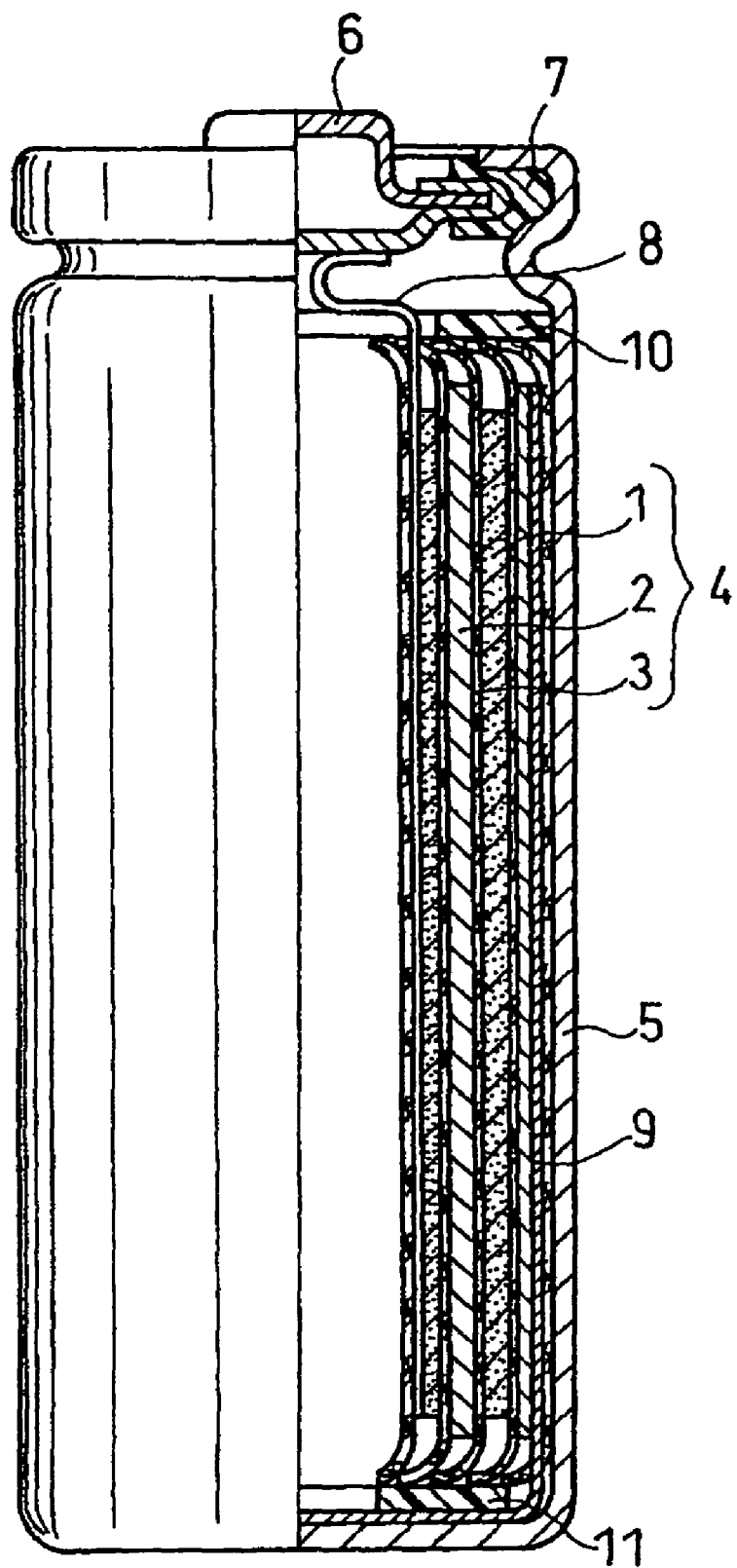
FIG. 1 is a schematic view, partially in vertical cross section, of a secondary battery in accordance with one embodiment of the present invention.

FIG. 1 shows a secondary battery in accordance with one embodiment of the present invention.

The secondary battery shown in FIG. 1 comprises an electrode assembly 4, a battery can 5 and an electrolyte (not shown in the drawing).

The electrode assembly 4 comprises a strip-shaped positive electrode plate 1, a strip-shaped negative electrode plate 2, and a strip-shaped separator 3 interposed between the positive electrode plate 1 and the negative electrode plate 2. The electrode assembly 4 is formed by spirally winding the positive electrode plate 1 and the negative electrode plate 2 with the separator 3 interposed therebetween.

The electrode assembly 4 is housed into the battery can 5. On the top and bottom of the electrode assembly 4 are placed an upper insulating ring 10 and a lower insulating ring 11, respectively.

The opening of the battery can 5 is hermetically sealed with a battery lid 6, with the edge of the opening crimping onto the periphery of the battery lid 6. The battery can 5 functions as the negative electrode terminal. The battery lid 6 functions as the positive electrode terminal.

The positive electrode plate 1 is connected to the battery lid 6 with a positive electrode lead 8. The negative electrode plate 2 is connected to the battery can 5 with a negative electrode lead 9.

A description is now given of an electrode assembly that can be used in the present invention.

Figure 2:
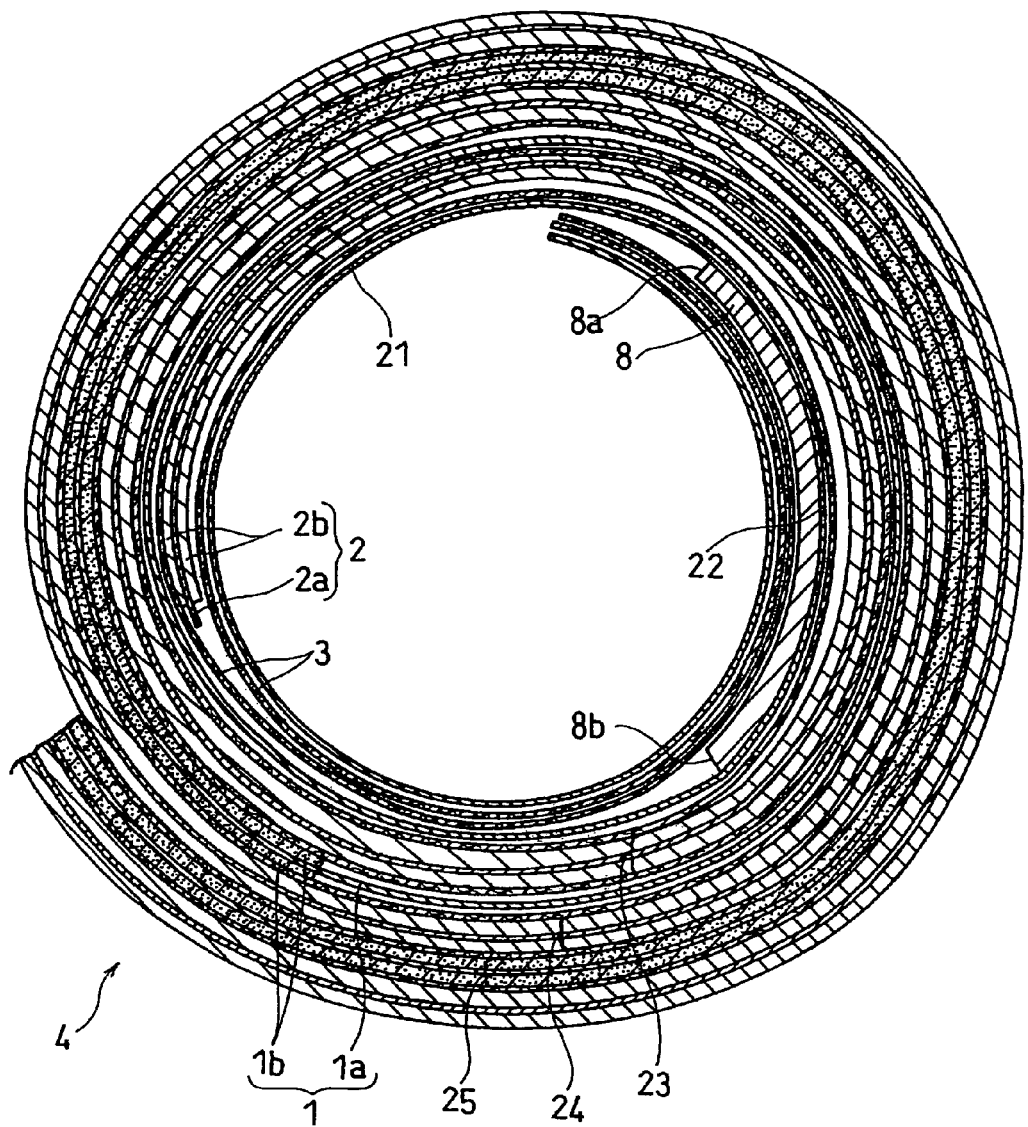
FIG. 2 is a transverse sectional view of an electrode assembly included in a secondary battery in accordance with one embodiment of the present invention, schematically showing the portion at initial winding side of the electrode assembly.

FIG. 2 schematically shows the portion at initial winding side of an electrode assembly 4 included in a secondary battery in accordance with one embodiment of the present invention.

A positive electrode plate 1 comprises a positive electrode current collector 1a and positive electrode material mixture layers 1b carried on both surfaces of the current collector 1a. Likewise, A negative electrode plate 2 comprises a negative electrode current collector 2a and negative electrode material mixture layers 2b carried on both surfaces of the current collector 2a.

The positive electrode plate 1 has a first end at the initial winding side and a second end at the final winding side. The positive electrode plate 1 has, in a vicinity of the first end, an exposed portion 21 of the positive electrode current collector having no positive electrode material mixture layer formed thereon. To a predetermined portion of the exposed portion is connected a positive electrode lead 8. Accordingly, the connecting portion 22 of the positive electrode lead 8 should be located in the innermost winding turn in the electrode assembly 4. A first winding turn 23 outwardly adjacent to the connecting portion 22 of the positive electrode lead 8 with the separator 3 therebetween, and a second winding turn 24 outwardly adjacent to the first winding turn with the separator 3 therebetween, comprise a portion of the negative electrode plate carrying the negative electrode material mixture layer. Between the first and second winding turns lies the exposed portion of the positive electrode current collector sandwiched between two separators.

In FIG. 2, a third winding turn 25 outwardly adjacent to the second winding turn 24 with the separator 3 therebetween comprises a portion of the positive electrode plate carrying the positive electrode material mixture layer.

As described above, by providing the positive electrode lead 8 in the innermost winding turn of the electrode assembly, the connecting portion 22 to which the positive electrode lead is connected becomes difficult to bend. The positive electrode lead 8, however, has a certain thickness, so that a protrusion can be formed resulting from two ends, i.e., the end 8a at the winding start side and the end 8b at the winding end side, of the positive electrode lead 8 which is arranged parallel to the width direction of the positive electrode plate. For this reason, a portion of the winding turn comprising the positive and negative electrode plates and the separator which is located above the end 8a at the winding start side and the end 8b at the winding end side of the positive electrode lead arranged parallel to the width direction of the positive electrode current collector has a larger curvature than other portion of the winding turn. In this case, if the positive electrode plate is overlaid on the end 8a or 8b of the positive electrode lead 8, the positive electrode plate may be broken or damaged.

In the present invention, the adjacent first and second winding turns sequentially arranged outside the connecting portion of the positive electrode lead 8 function as a cushion. Because of this, even when the positive electrode lead 8 is provided in the innermost winding turn of the electrode assembly, it is possible to reduce the curvature of the portion of the positive electrode plate carrying the positive electrode material mixture layers that is overlaid on the connecting portion 22 of the positive electrode lead. For example, even when the portion of the positive electrode plate 1 whose positive electrode current collector is thin is overlaid on the connecting portion 22 of the positive electrode lead, it is possible to protect that portion from breakage or damage.

In the electrode assembly, the positive electrode lead may be formed on the inner side of the exposed portion of the positive electrode current collector, or it may be formed on the outer side of the same. In order to reduce the influence of the protrusion resulting from the ends 8a and 8b of the positive electrode lead 8, the positive electrode lead 8 is preferably formed on the inner side of the exposed portion of the positive electrode current collector.

In the present invention, the third winding turn and subsequent winding turns may comprise a portion of the negative electrode plate carrying the negative electrode material mixture layers. This is because the degree of curvature of the portion of the positive electrode plate having the positive electrode material mixture layers that is overlaid on the connecting portion 22 of positive electrode lead is reduced as the number of winding turns sequentially arranged outside the connecting portion 22 is increased.

The number of winding turns comprising the portion of the negative electrode plate carrying the negative electrode material mixture layers, which are sequentially arranged outside the connecting portion 22 of the positive electrode lead 8, is preferably 2 to 3. This is because, as the number of winding turns that function as a cushion increases, the portion of the negative electrode plate that does not contribute to the battery capacity enlarges, resulting in a low battery capacity.

In the present invention, the negative electrode plate is preferably softer than the positive electrode plate. This further improves the cushioning effect of the negative electrode. In the case of a lithium ion secondary battery, for example, by using a lithium-containing composite-oxide as the positive electrode active material and a carbon material as the negative electrode active material, the negative electrode plate can be formed softer than the positive electrode plate.

The final winding portion of the electrode assembly 4 may comprise any of the positive electrode current collector, the negative electrode current collector and the separator. By way of example, FIG. 3 shows a case in which the final winding portion comprises the separator.

Figure 3:
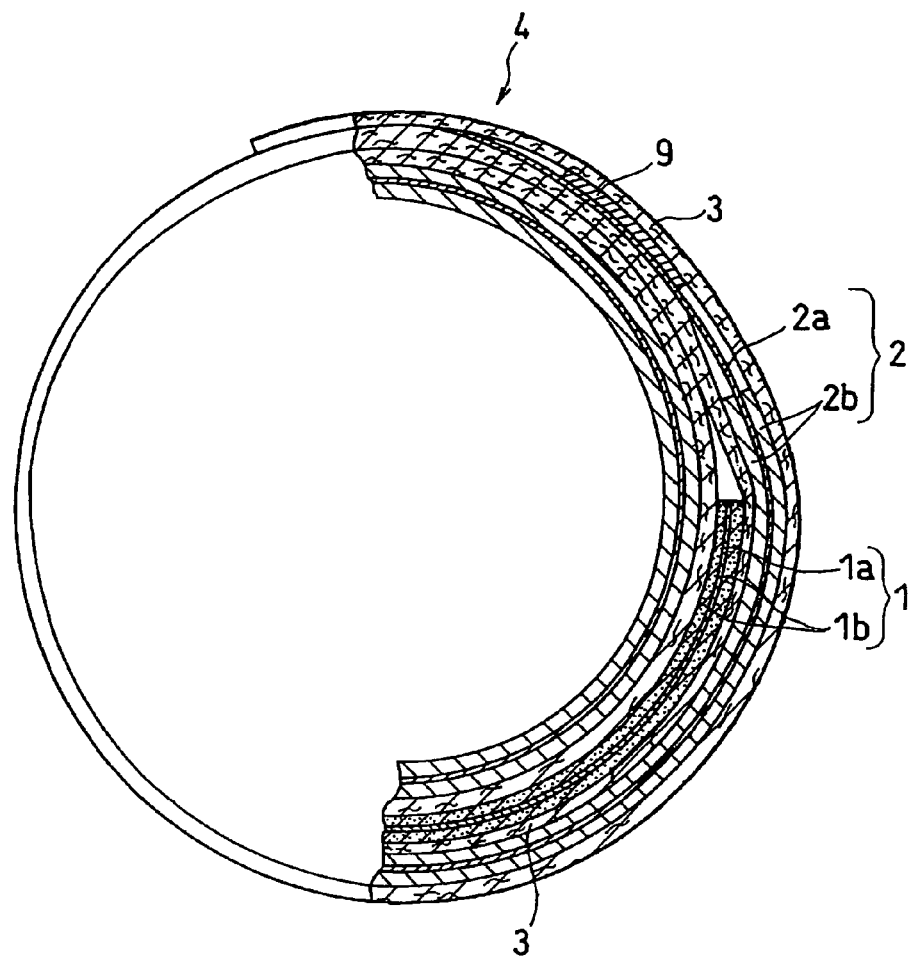
FIG. 3 is a transverse sectional view of the electrode assembly, schematically showing the portion at final winding side of the electrode assembly.

As can be seen from FIG. 3, the negative electrode plate 2 is located nearer to the winding end than the positive electrode plate 1. The separator 3 is arranged such that it covers the negative electrode plate.

In order to prevent the electrode assembly from unwinding, the final winding portion may be fixed to the electrode assembly by attaching an insulating tape on the final winding portion.

The negative electrode plate 2 has a first end at the initial winding side and a second end at the final winding side. A negative electrode lead 9 is, for example, connected to an exposed portion of the negative electrode current collector formed in a vicinity of the second end of the negative electrode plate as shown in FIG. 3. Alternatively, the negative electrode lead 9 may be connected to an exposed portion of the negative electrode current collector formed in a vicinity of the first end.

Figure 4:
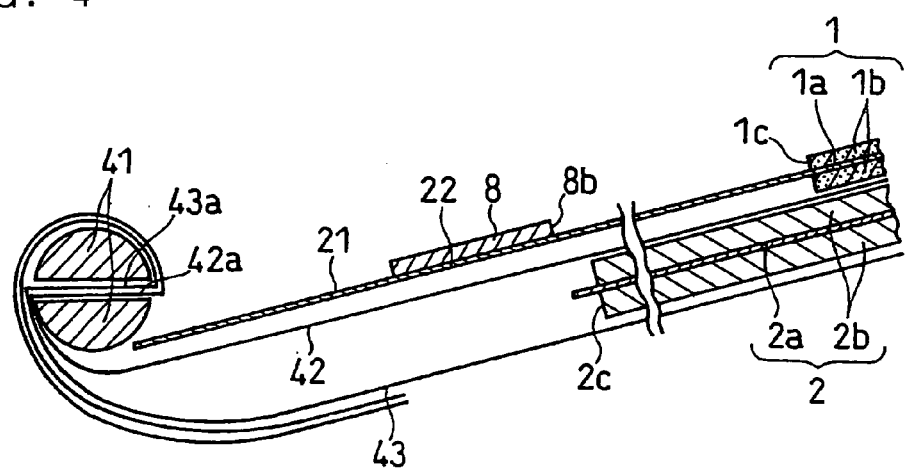
FIG. 4 is a schematic diagram illustrating an arrangement of a positive electrode plate, a negative electrode plate and a separator at the start of winding in the formation of the electrode assembly.

A description is now given of a process for forming the electrode assembly 4 with reference to FIG. 4.

Using two halves of a winding core 41 each having a semicircular cross section, an end portion 42a of a separator 42 and an end portion 43a of a separator 43 both positioned at the initial winding side are sandwiched between the flat portions of the two halves of the winding core 41. With the arrangement of a positive electrode plate 1, the separator 42, a negative electrode plate 2 and the separator 43 as shown in FIG. 4, the positive electrode plate 1 and the negative electrode plate 2 are wound around the winding core 41 so as to form an electrode assembly. In this process, the number of winding turns comprising the negative electrode plate that is sequentially arranged outside the connecting portion 22 of the positive electrode lead can be adjusted by, for example, appropriately adjusting the position at which an end 2c at the initial winding side of the negative electrode material mixture layers 2b is spirally wound around the winding core, and the length between the end 8b of the positive electrode lead 8 at the final winding side and the end 1c of the positive electrode material mixture layers 1b at the initial winding side.

After the formation of the electrode assembly, the winding core should be removed from the electrode assembly.

In the manner as described above, an electrode assembly as shown in FIG. 2 can be obtained in which the first winding turn outwardly adjacent to the connecting portion of the positive electrode lead and the second winding turn outwardly adjacent to the first winding turn comprise portions of the negative electrode plate carrying the negative electrode material mixture layers, and the third winding turn outwardly adjacent to the second winding turn comprises a portion of the positive electrode plate carrying the positive electrode material mixture layers.

In the formation process of the electrode assembly, it is preferred to adjust the relative position of the positive electrode plate and the negative electrode plate such that the end 2c at the initial winding side of the negative electrode material mixture layers of the negative electrode plate is wound around the winding core after the end 8b of the positive electrode lead is wound around the winding core, as shown in FIG. 4. Thereby, it is possible to reduce the portion where the positive electrode material mixture layer of the positive electrode plate and the negative electrode material mixture layer of the negative electrode plate are not opposed to each other, i.e., the portion that does not contribute to the battery capacity, preventing the battery capacity from decreasing.

In the present invention, as the positive electrode active material, negative electrode active material, positive electrode current collector, negative electrode current collector and electrolyte, anything known in the art can be used.

The present invention is described in detail below with reference to examples.

Example 1

Battery 1

(a) Production of Positive Electrode Plate

A positive electrode material mixture paste was prepared by mixing 3 kg of lithium cobalt oxide serving as a positive electrode active material, 1 kg of N-methyl-2-pyrrolidone solution containing 12 wt % polyvinylidene fluoride (#1320 available from Kureha Chemical Industry Co., Ltd.) serving as a binder, 90 g of acetylene black, and an appropriate amount of N-methyl-2-pyrrolidone (hereinafter also referred to as NMP) with the use of a double arm kneader.

The obtained positive electrode material mixture paste was applied onto both surfaces of the positive electrode current collector made of a 15 μm thick aluminum foil, followed by drying and rolling. Thereby, a 160 μm thick positive electrode plate was produced. In a vicinity of the first end at the initial winding side of this positive electrode plate was formed an exposed portion having a predetermined size in which both surfaces of the positive electrode current collector were exposed. A positive electrode lead was then connected to a predetermined position of the exposed portion such that the positive electrode lead would be positioned in the innermost winding turn in the resulting electrode assembly. Further, the length between the end at the final winding side of the positive electrode lead and the end at the initial winding side of the positive electrode material mixture layers was adjusted such that adjacent first and second winding turns sequentially arranged outside the connecting portion of the positive electrode lead would comprise a portion of the negative electrode plate carrying the negative electrode material mixture layers.

At the second end of the positive electrode plate, the positive electrode current collector had the positive electrode material mixture layers carried on both surfaces thereof.

(b) Production of Negative Electrode Plate

A negative electrode material mixture paste was prepared by mixing 3 kg of artificial graphite serving as a negative electrode active material, 75 g of styrene-butadiene copolymer serving as a binder, 30 g of carboxymethyl cellulose serving as a thickener and an appropriate amount of water with the use of a double arm kneader. The addition of the styrene-butadiene copolymer was done using an aqueous dispersion containing 40 wt % of styrene-butadiene copolymer as a solid (BM-400B available from Zeon Corporation, Japan) such that the solid content would be 75 g.

Subsequently, the obtained negative electrode material mixture paste was applied onto both surfaces of a negative electrode current collector made of a 10 μm thick copper foil, followed by drying and rolling. Thereby, a 180 μm thick negative electrode plate was produced. Unlike the positive electrode plate, at the first end of the negative electrode plate, the negative electrode current collector had the negative electrode material mixture layers carried on both surfaces thereof. In a vicinity of the second end of the negative electrode plate, an exposed portion of the negative electrode current collector was formed. Then, a negative electrode lead was connected to a predetermined position of the exposed portion.

(c) Preparation of Electrolyte

A solvent mixture was prepared by mixing ethylene carbonate, dimethyl carbonate and methyl ethyl carbonate at a volume ratio of 2:3:3. Lithium hexafluorophosphate ($LiPF_6$) was dissolved in the solvent mixture at a concentration of 1 mol/L. Vinylene carbonate serving as an additive was further added thereto. Thereby, an electrolyte was prepared. The amount of vinylene carbonate added was 3 wt % of the electrolyte.

(d) Production of Electrode Assembly

The ends of two 20 μm thick microporous polyethylene films serving as separators were sandwiched between the halves of a winding core. Then, the exposed portion of the positive electrode current collector having the positive electrode lead connected thereto was arranged between the winding core and one separator which would be positioned in the inner side when wound. The exposed portion was wound around the winding core once from the first end. The positive electrode lead was in this innermost winding turn.

Subsequently, the negative electrode plate 2 was arranged between the two separators. The negative electrode plate was wound around on the exposed portion of the positive electrode current collector such that the negative electrode plate 2 faced the exposed portion with the separator therebetween.

In this manner, an electrode assembly was produced in which the first winding turn outwardly adjacent to the connecting portion of the positive electrode lead with the separator therebetween and the second winding turn outwardly adjacent to the first winding turn with the separator therebetween comprised the portion of the negative electrode plate carrying the negative electrode material mixture layers, and the third winding turn outwardly adjacent to the second winding turn with the separator therebetween comprised the portion of the positive electrode plate carrying the positive electrode material mixture layers.

(Assembly of Battery)

The obtained electrode assembly was housed into a bottomed cylindrical battery can. An appropriate amount of electrolyte prepared as described above was then injected into the battery can. The battery can was then hermetically sealed with a battery lid, with the opening end of the battery can crimping onto the battery lid with an insulating packing therebetween. Thereby, a cylindrical lithium ion secondary battery having a diameter of 18 mm and a height of 65 mm was produced. The obtained battery was denoted as battery 1.

Battery 2

A lithium ion secondary battery was produced in the same manner as the battery 1 was produced except that the electrode assembly was formed such that the first winding turn outwardly adjacent to the connecting portion of the positive electrode lead with the separator therebetween, the second winding turn outwardly adjacent to the first winding turn with the separator therebetween, and the third winding turn outwardly adjacent to the second winding turn with the separator therebetween, comprised the portion of the negative electrode plate having the negative electrode material mixture carried thereon. The obtained battery was denoted as battery 2.

Battery 3

A lithium ion secondary battery was produced in the same manner as the battery 1 was produced except that the electrode assembly was formed such that the first winding turn outwardly adjacent to the connecting portion of the positive electrode lead with the separator therebetween, the second winding turn outwardly adjacent to the first winding turn with the separator therebetween, the third winding turn outwardly adjacent to the second winding turn with the separator therebetween, and the fourth winding turn outwardly adjacent to the third winding turn with the separator therebetween, comprised the portion of the negative electrode plate having the negative electrode material mixture carried thereon. The obtained battery was denoted as battery 3.

Battery 4

A lithium ion secondary battery was produced in the same manner as the battery 1 was produced except that the electrode assembly was formed such that the first winding turn outwardly adjacent to the connecting portion of the positive electrode lead with the separator therebetween, the second winding turn outwardly adjacent to the first winding turn with the separator therebetween, the third winding turn outwardly adjacent to the second winding turn with the separator therebetween, the fourth winding turn outwardly adjacent to the third winding turn with the separator therebetween, and the fifth winding turn outwardly adjacent to the fourth winding turn with the separator therebetween, comprised the portion of the negative electrode plate having the negative electrode material mixture carried thereon. The obtained battery was denoted as battery 4.

(Comparative Battery 1)

A lithium ion secondary battery was produced in the same manner as the battery 1 was produced except that the electrode assembly was formed such that the first winding turn outwardly adjacent to the connecting portion of the positive electrode lead with the separator therebetween comprised the portion of the negative electrode plate having the negative electrode material mixture carried thereon, and the second winding turn outwardly adjacent to the first winding turn with the separator therebetween comprised the portion of the positive electrode plate having the positive electrode material mixture carried thereon. The obtained battery was denoted as comparative battery 1.

The batteries 1 to 4 and the comparative battery 1 produced above were evaluated in terms of presence or absence of breakage in the positive electrode plate and in terms of battery capacity.

(e) Presence or Absence of Breakage in Positive Electrode Plate

Thirty units of each of the batteries 1 to 4 and the comparative battery 1 were produced, and then disassembled. Subsequently, the portion of the positive electrode plate carrying the positive electrode material mixture layers of each battery was visually checked for the presence or absence of breakage.

(f) Battery Capacity

Battery capacity was determined using five of each of the batteries 1 to 4 and the comparative battery 1.

Each battery was discharged at a constant current of 400 mA (0.2 ItA, where I represents current and t represents time) to an end-of-discharge voltage of 3.0 V. The charge/discharge cycle was then repeated three times, in each of which charge was performed at a constant current of 1400 mA (0.7 ItA) until the battery voltage reached 4.2 V, and then discharge was performed at a constant current of 400 mA (0.2 ItA) to an end-of-discharge voltage of 3.0 V. The discharge capacities of five batteries at the third cycle were measured, and then the average was calculated using the measured discharge capacities of five batteries. The obtained average value was denoted as battery capacity. The designed capacity of the batteries 1 to 4 and the comparative battery 1 was 2000 mAh.

TABLE 1

| | Number of broken positive electrode plates (unit) | Battery capacity (mAh) |
| --- | --- | --- |
| Battery 1 | 0/30 | 2200 |
| Battery 2 | 0/30 | 2170 |
| Battery 3 | 0/30 | 2110 |
| Battery 4 | 0/30 | 2050 |
| Comp. Battery 1 | 5/30 | 2200 |

As can be seen from the results of Table 1, in the batteries 1 to 4, no breakage was observed in the portion of the positive electrode plate having the positive electrode material mixture carried thereon. In contrast, in the comparative battery 1, breakage of the positive electrode plate was observed in five batteries out of thirty batteries. In the five batteries, the positive electrode plates were not broken completely but partially.

The foregoing illustrates that the breakage of the positive electrode plate can be prevented by forming at least two adjacent winding turns comprising the portion of the negative electrode plate carrying the negative electrode material mixture layers outside the connecting portion of the positive electrode lead.

Moreover, the results of the batteries 1 to 4 indicate that the battery capacity decreased as the number of winding turns comprising the portion of the negative electrode plate carrying the negative electrode material mixture layers which were arranged sequentially outside the connecting portion of the positive electrode lead was increased. This is because the area where the positive electrode material mixture layer of the positive electrode plate and the negative electrode material mixture layer of the negative electrode plate did not face each other, i.e., the portion that did not contribute to the battery capacity, increased. Accordingly, the number of winding turns which are arranged sequentially outside the connecting portion of the positive electrode lead is preferably 2 to 3.

Although, in the above examples, the positive electrode plate in which the positive electrode material mixture layers were formed on both surfaces of the positive electrode current collector and the negative electrode plate in which the negative electrode material mixture layers were formed on both surfaces of the negative electrode current collector were used, the effect of the present invention is equally obtained even when the positive electrode plate in which the positive electrode material mixture layer is formed only on one surface of the positive electrode current collector and the negative electrode plate in which the negative electrode material mixture layer is formed only on one surface of the negative electrode current collector are used.

Although the foregoing discussed the case in which the present invention is a lithium ion secondary battery, the effect of the present invention is equally attained in other batteries than the lithium ion secondary battery such as the magnesium secondary battery.

INDUSTRIAL APPLICABILITY

The present invention prevents the portion of the positive electrode plate carrying the positive electrode material mixture layer from breaking or an internal short-circuit from occurring, and makes it possible to provide a highly reliable secondary battery. For this reason, the secondary battery of the present invention is suitable as power sources for electronic equipment that require highly reliable power sources such as notebook personal computers and digital cameras.

The invention claimed is:

1. A secondary battery comprising an electrode assembly in which a strip-shaped positive electrode plate and a strip-shaped negative electrode plate are spirally wound with a strip-shaped separator interposed therebetween,
    said positive electrode plate comprising a positive electrode current collector and a positive electrode material mixture layer carried on said positive electrode current collector, and
    said negative electrode plate comprising a negative electrode current collector and a negative electrode material mixture layer carried on said negative electrode current collector,
    wherein said positive electrode plate has, in a vicinity of a first end at an initial winding side, an exposed portion of said positive electrode current collector having said positive electrode material mixture layer not formed thereon, and a positive electrode lead connected to said exposed portion, and
    wherein a first winding turn outwardly adjacent to a connecting portion of said positive electrode lead with said separator interposed therebetween, and a second winding turn outwardly adjacent to said first winding turn with said separator interposed therebetween, comprise a portion of said negative electrode plate carrying said negative electrode material mixture layer, and comprise a portion of said positive electrode current collector having said positive electrode material mixture layer not formed thereon.

2. The secondary battery in accordance with claim 1, wherein a third winding turn outwardly adjacent to said second winding turn with said separator interposed therebetween comprises a portion of said positive electrode plate carrying said positive electrode material mixture layer.

* * * * *